(12) United States Patent
Rupp (10) Patent No.: US 7,662,279 B2
(45) Date of Patent: Feb. 16, 2010

(54) FILTERING DEVICE, IN PARTICULAR FOR FISH BASINS

(76) Inventor: Michael Rupp, Schulerstrasse 22, Pforzheim (DE) 75173

( * ) Notice: Subject to any disclaimer, the term of this patent is extended or adjusted under 35 U.S.C. 154(b) by 0 days.

(21) Appl. No.: 11/815,065

(22) PCT Filed: Jan. 18, 2006

(86) PCT No.: PCT/DE2006/000061

§ 371 (c)(1),
(2), (4) Date: Jun. 2, 2008

(87) PCT Pub. No.: WO2006/079311

PCT Pub. Date: Aug. 3, 2006

(65) Prior Publication Data

US 2008/0314810 A1  Dec. 25, 2008

(30) Foreign Application Priority Data

Jan. 28, 2005  (DE) .................. 20 2005 001 395 U (51) Int. Cl.
*A01K 63/04* (2006.01)
*B01D 29/09* (2006.01)
*B01D 29/60* (2006.01)
*B01D 33/80* (2006.01)

(52) U.S. Cl. .................. 210/151; 210/167.22; 210/400; 210/402; 119/227

(58) Field of Classification Search .................. 210/150, 210/151, 156, 157, 167.21, 167.22, 400, 210/402; 119/226, 227, 259, 260
See application file for complete search history.

(56) References Cited

U.S. PATENT DOCUMENTS

| 3,780,863 | A  | * | 12/1973 | Light ........................... 210/97 |
| 4,826,596 | A  | * | 5/1989  | Hirs ........................... 210/387 |
| 5,177,335 | A  | * | 1/1993  | Hartwig et al. ........... 219/69.14 |
| 6,174,446 | B1 | * | 1/2001  | Andresen et al. ............ 210/744 |
| 6,808,624 | B1 | * | 10/2004 | Norris .................... 210/167.21 |
| 7,083,720 | B2 | * | 8/2006  | Miller ......................... 210/150 |
| 2004/0149233 | A1 | * | 8/2004 | Cummins .................... 119/227 |

FOREIGN PATENT DOCUMENTS

EP  0500212 A * 8/1992

\* cited by examiner

*Primary Examiner*—Fred Prince (57) ABSTRACT

A filtering device, in particular for fish basins, having a housing (10) encompassing a filter chamber (20) and a filter drum (30), which is rotatably disposed in the filter chamber (20) and is loadable with water to be purified, about which a filter belt (40) is guided along part of its circumference from a dispensing roller (42) to a receiving roller (41) that is driven by a paddle wheel (5) disposed outside the filter chamber (20). The paddles (51) of the filter wheel are activated by unpurified water in such a way that the filter belt (40) is wound from the dispensing roller (42) onto the receiving roller (41).

12 Claims, 8 Drawing Sheets

FILTERING DEVICE, IN PARTICULAR FOR FISH BASINS

The invention relates to a filtering device, in particular for fish basins.

PRIOR ART

Filtering devices are commercially available in which the water to be purified passes through a filter belt, during which process particles above a certain size deposit on the filter belt. The filter belt is guided from a dispensing roller to a receiving roller in such a way that this movement must either be performed manually, or through a motor that is controlled by a float, when the water level in the filter chamber rises by more than a certain amount.

The filtering capacity of this known solution is not satisfactory, the winding process of the filter belt from the dispensing roller to the receiving roller requires either constant monitoring or electric power, and with the appropriate connections.

DISCLOSURE OF THE INVENTION

It is the object of the invention to improve the filtering capacity of the known filtering device and to design it to be low-maintenance.

This object is met according to the invention according to the characteristics of claim 1.

The underlying concept of the invention thus lies in that, with an increasing degree of dirtying of the filter belt that loops around the filter drum, and resulting rising water level in the filter chamber, the unpurified water being delivered by a pump flows over an overflow onto the paddle wheel as a mechanical drive means and places a receiving roller for the dirty filter belt into rotation. This causes the receiving roller to continually wind up with its circumference the filter belt that is looped around the filter drum from the dispensing roller, causing unused filter belt that is permeable for the water being purified to advance onto the filter drum, the filtering effect to resume, and the water level to again drop below the overflow. The receiving roller may be biased by means of suitable spring means.

The energy that is necessary for this regulating process is thus generated solely in a mechanical fashion by the overflowing water.

According to an advantageous embodiment, the paddle wheel and receiving roller are advantageously connected to each other by means of a belt that is led over a gear mechanism having, for example, a gear ratio reduction of a approximately 1:100, so that one hundred rotations of the paddle wheel are translated into one rotation of the receiving roller and a length of filter belt corresponding to its circumference.

The filter drum advantageously has disposed in it a biologically active filter material (bio-reactor), for example a porous medium with a suitable bacteria population, which supplements the mechanical cleaning process through the pores of the filter belt.

Additional advantageous embodiments are specified in additional subclaims.

BRIEF DESCRIPTION OF THE DRAWINGS

A preferred exemplary embodiment of the inventive filtering device will now be explained in more detail with the aid of drawings, in which.

DESCRIPTION OF THE EXEMPLARY EMBODIMENT

Figure 1:
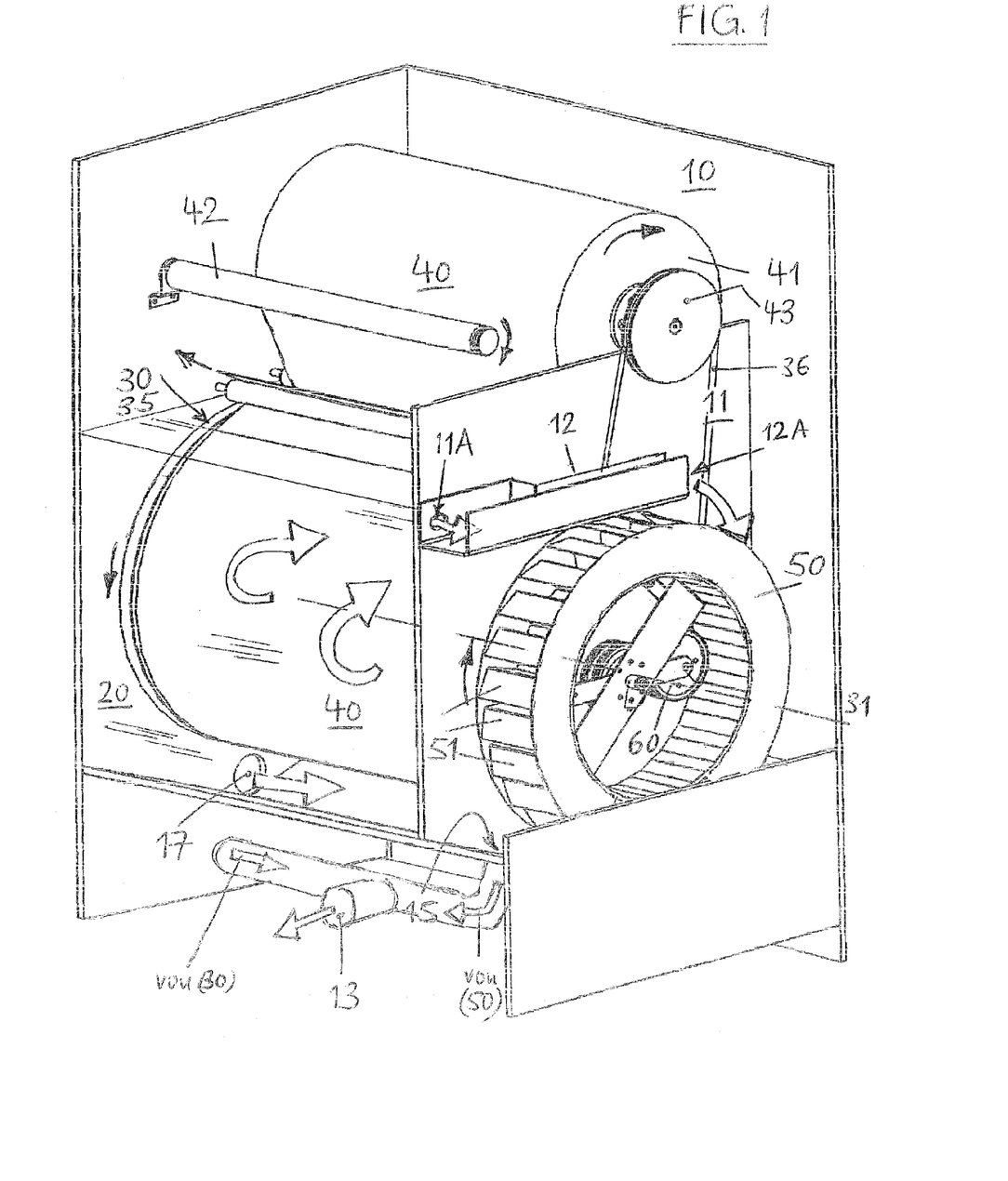
FIG. 1 is a perspective view of the partially opened filtering device with its essential components.
Figure 2:
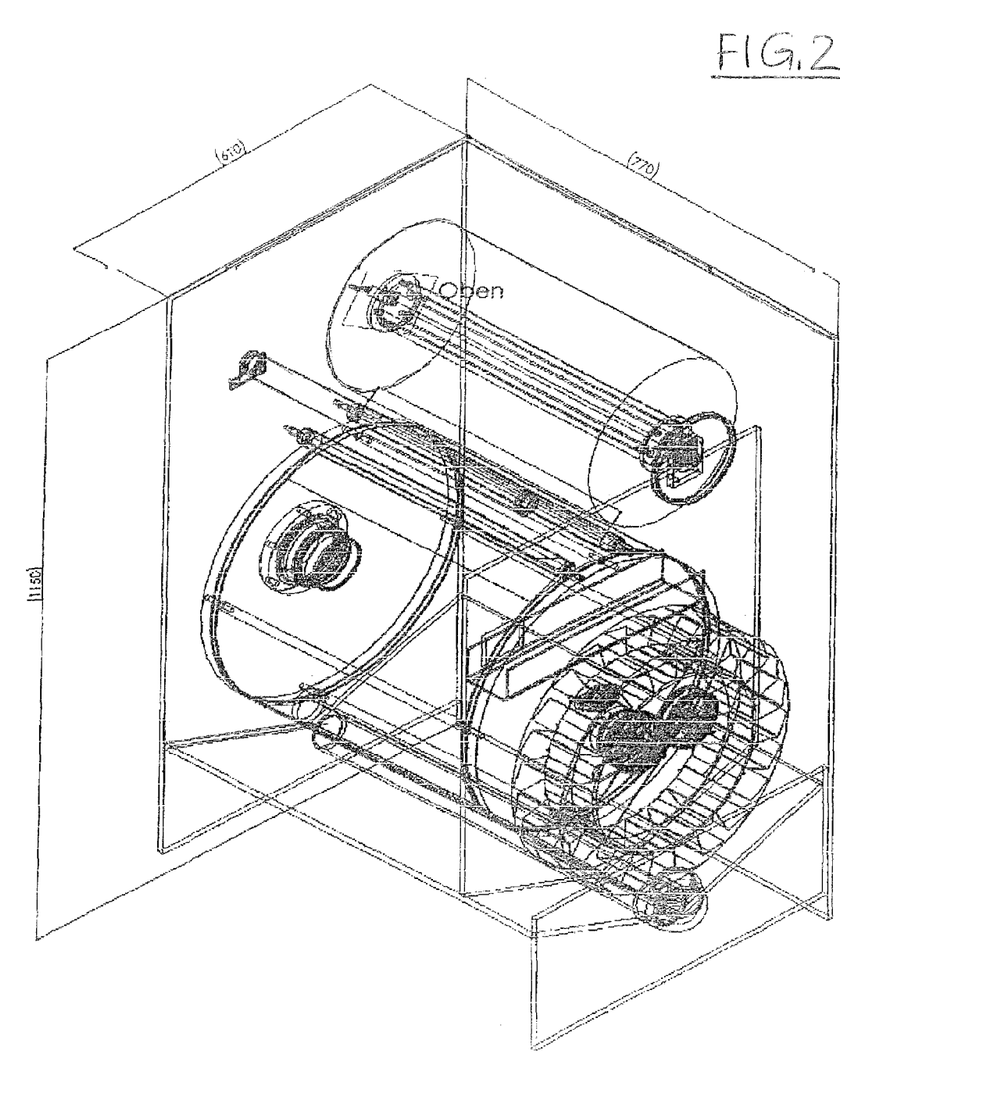
FIG. 2 is a view according to FIG. 2, in which the components are shown transparent.
Figure 3:
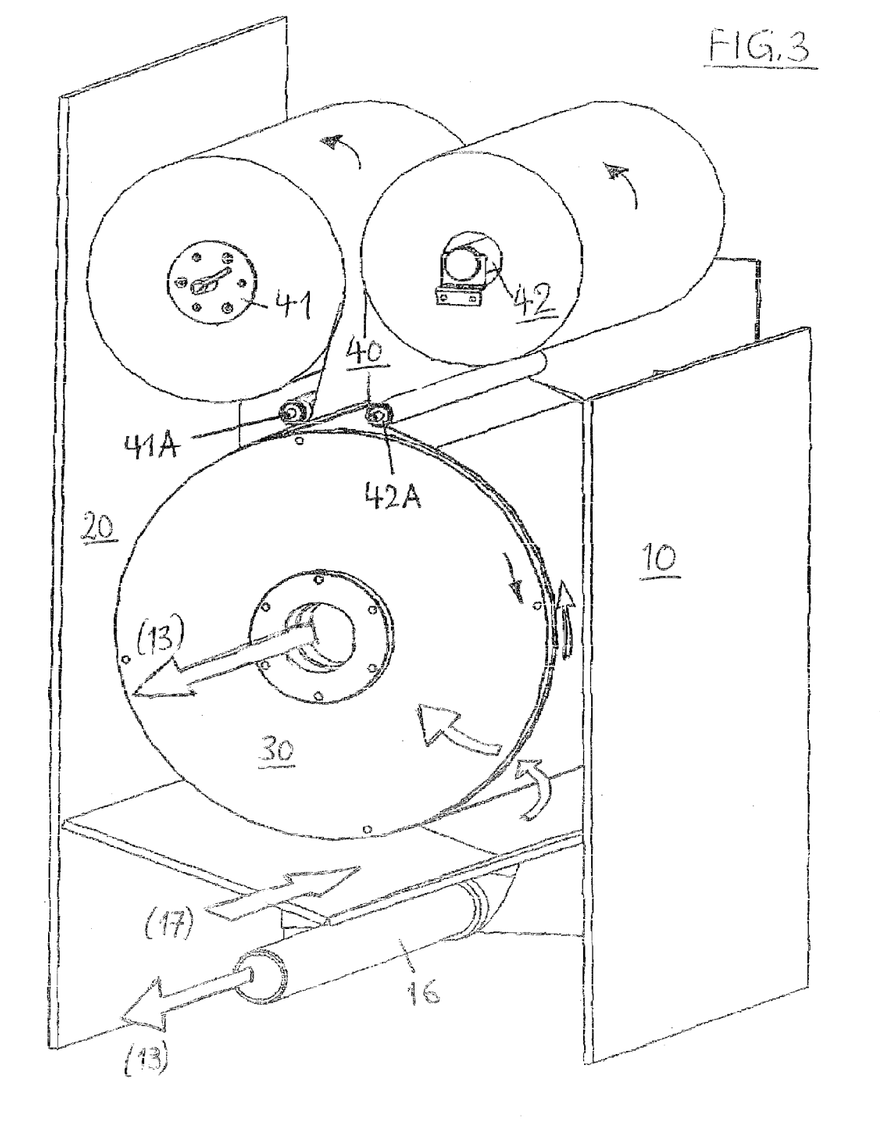
FIG. 3 is a perspective view from the side of the filtering device opposite the paddle wheel.
Figure 4:
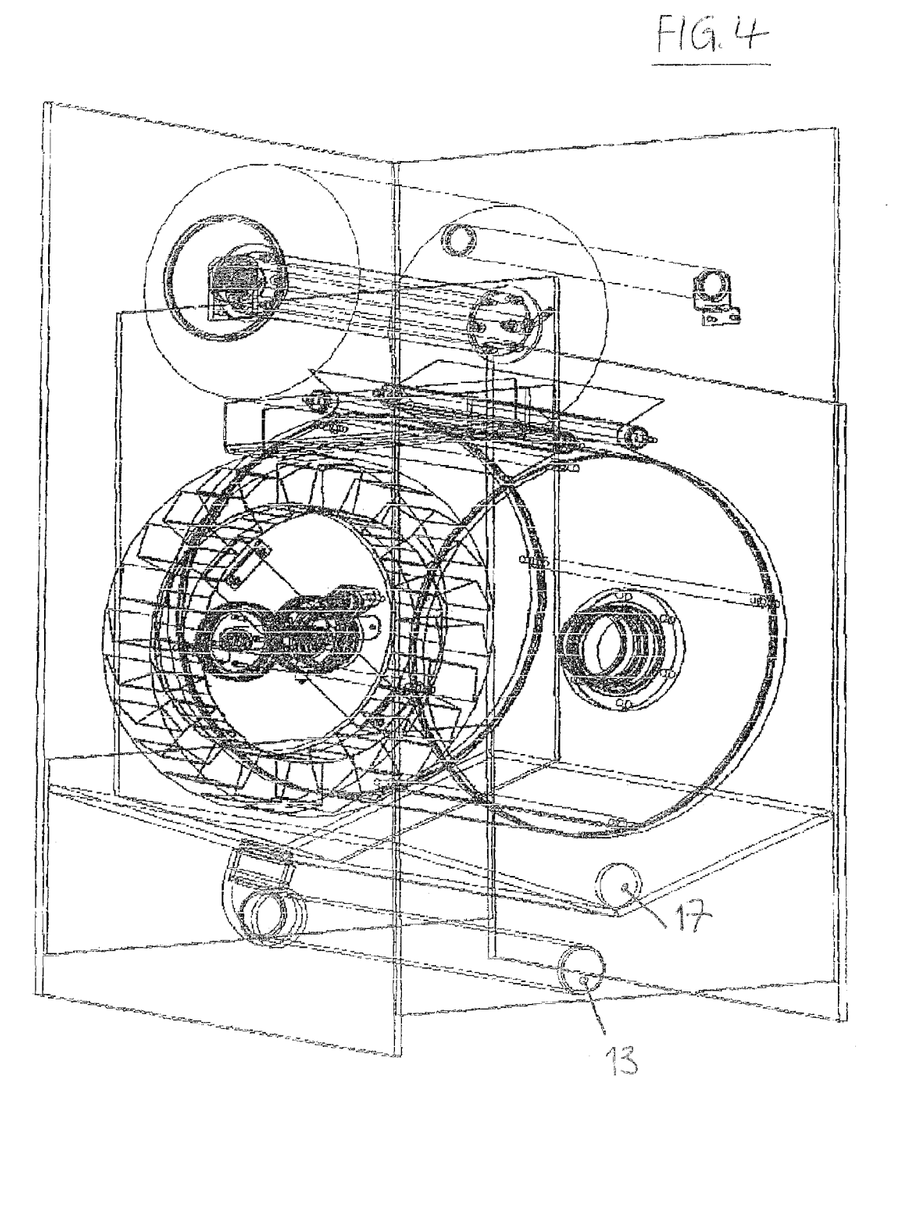
FIG. 4 is a view according to FIG. 3, with transparently depicted components.
Figure 5:
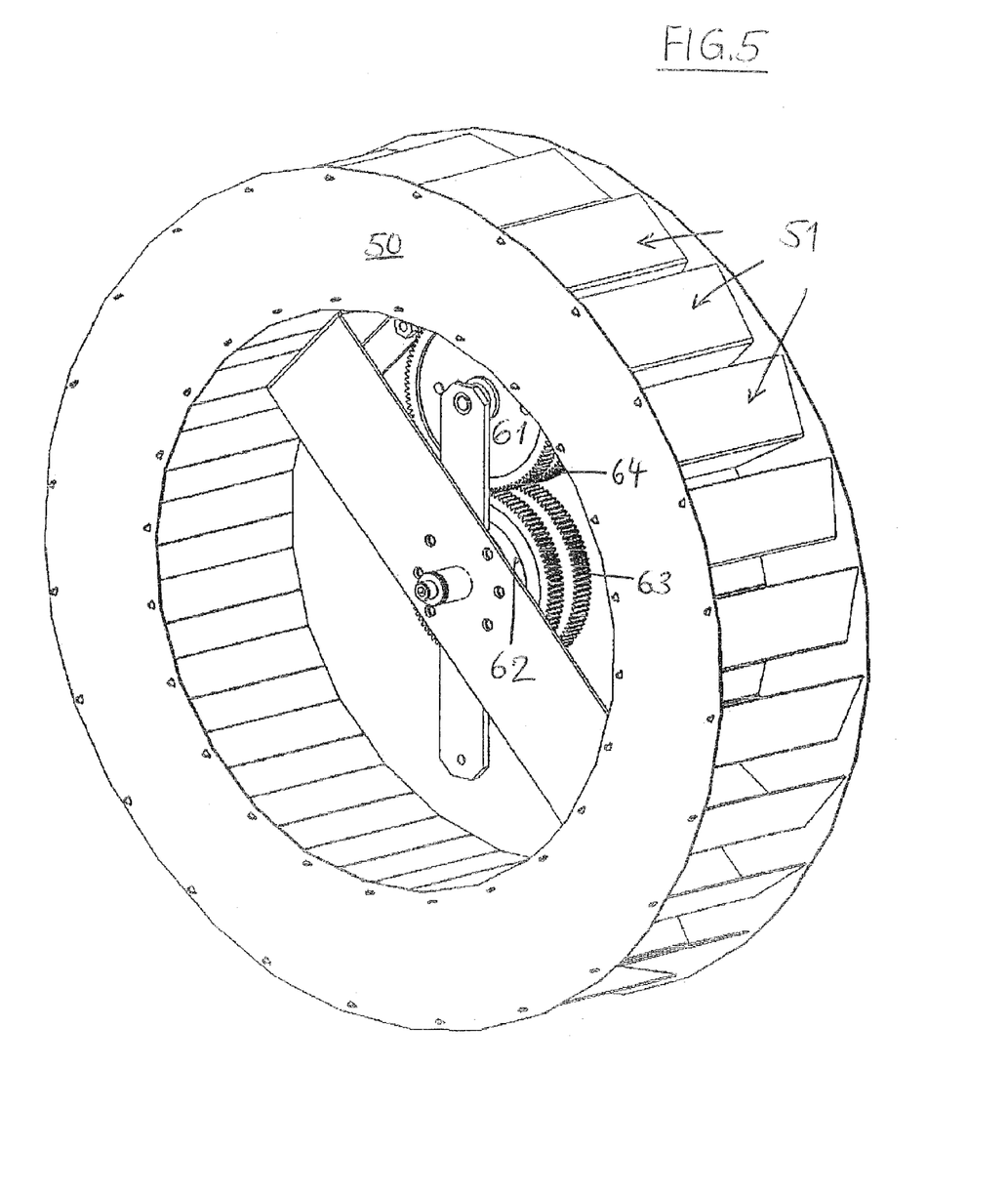
FIG. 5 is a perspective depiction of the paddle wheel with the internal gear mechanism.
Figure 6:
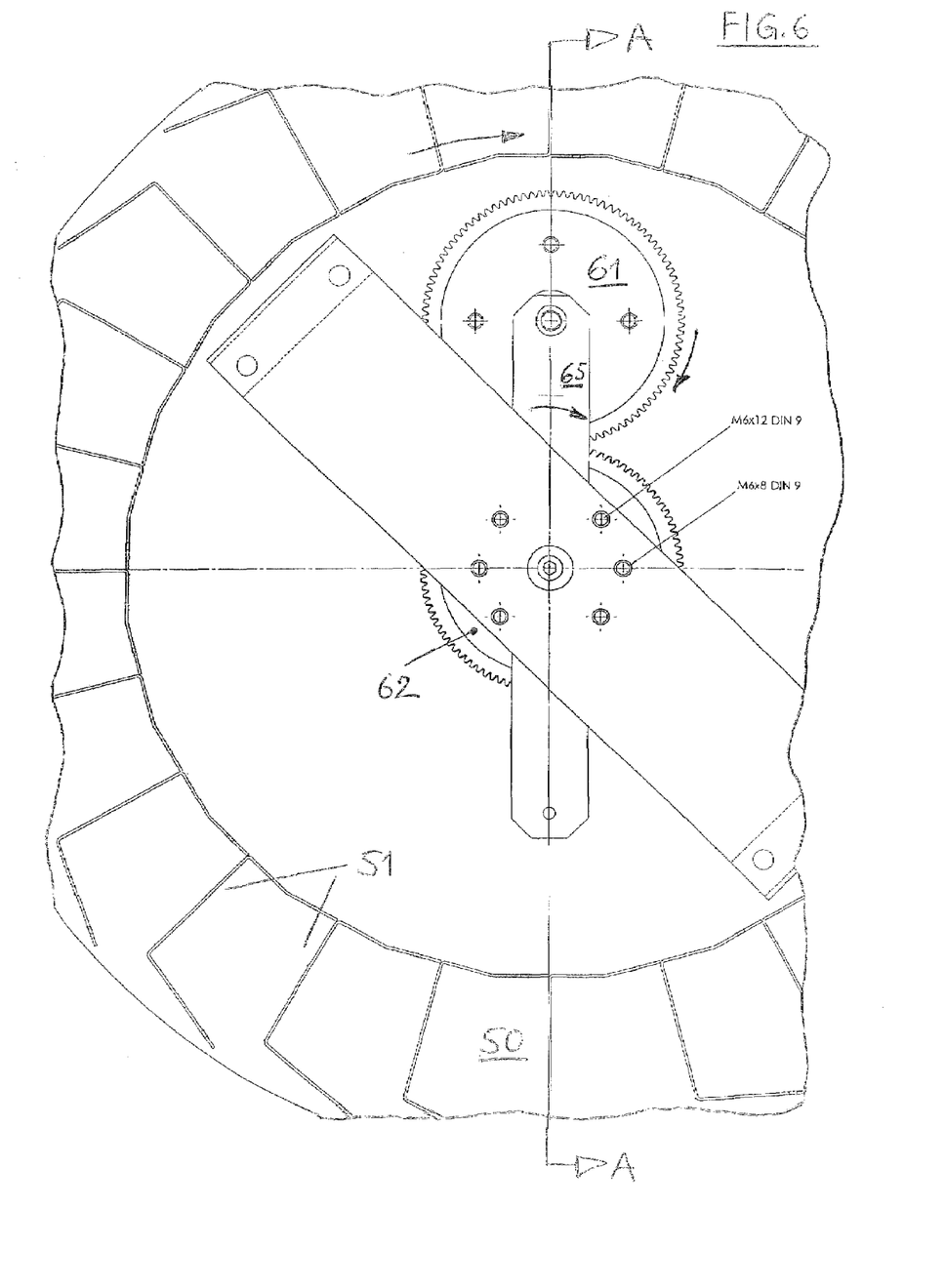
FIG. 6 is a partial view of the paddle wheel with the gear mechanism.
Figure 7:
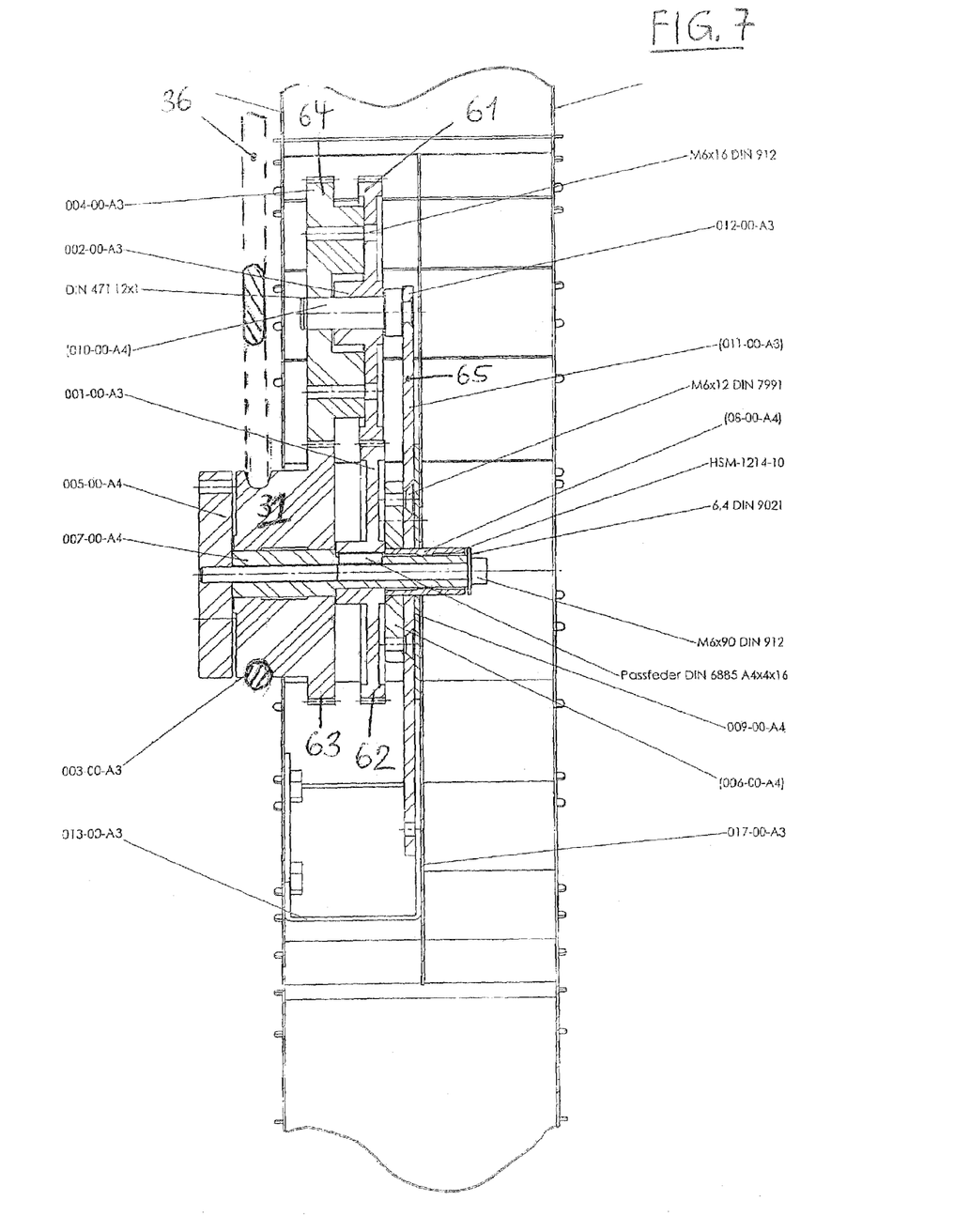
FIG. 7 shows a section through the paddle wheel with the gear mechanism in the plane A-A of FIG. 6.
Figure 8:
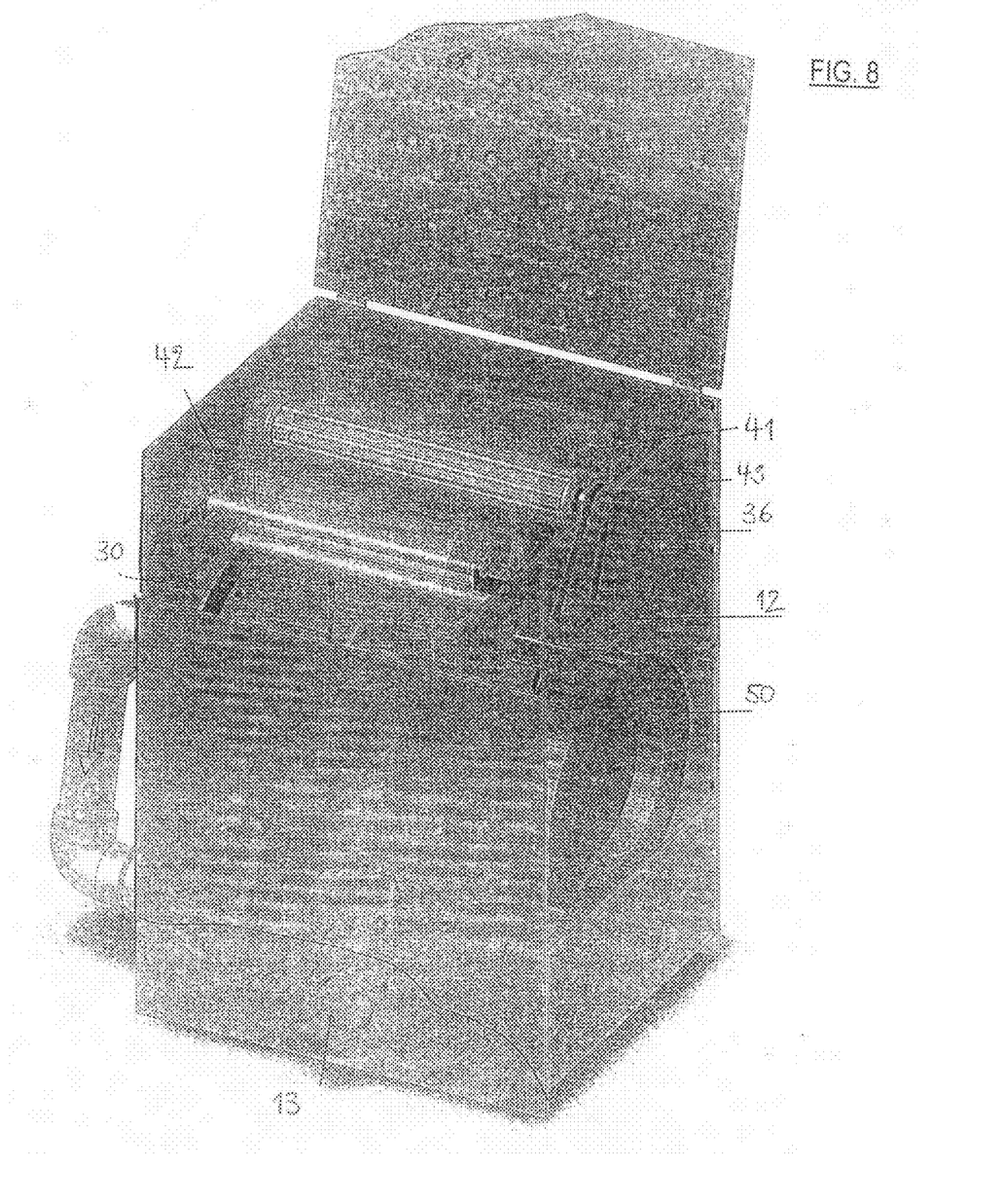
FIG. 8 is a perspective general view with an opened housing cover.

The filtering device consists of a housing 10 encompassing a filter chamber 20 and a filter drum 30, which is supported so as to be able to rotate horizontally about a shaft in the housing 10. The wall of the filter drum 30 consists, for example, of perforated sheet metal or wire mesh, so that the water to be purified can pass from the filter chamber 20 into the interior of the filter drum. The interior of the filter drum is filled with bioactive filter material 35.

Above the filter drum 30 and parallel with the same, a receiving roller 41 and a dispensing roller 42 are rotatably supported in the housing 10. The dispensing roller 42 and receiving roller 41 serve for making available and advancing a filter belt 40 that loops around the filter drum 30 between the dispensing roller 42 and receiving roller 41 with the aid of deflection rollers 41A, 42A along a major portion of its circumference.

The contaminated water from the fish farming basin is passed via a first port 17 (inlet) into the filter chamber 20, flows through the filter belt 40 and filter material 35 and flows off via a second port (outlet) 13.

The receiving roller 41 is connected by means of a pulley 43 via a belt 36 to a pulley 31 that is disposed on the shaft of a paddle wheel 50 having paddles 51. The paddle wheel is supported outside the filter chamber 20 in a dividing wall 11 of the housing 10. Disposed above the paddle wheel 50 at a slight incline towards its discharge end 12A is a channel 12, which is connected via an overflow opening 11A to the filter chamber 20, so that when a water level that is defined by the position of the overflow opening 11A is reached by water that is not purified due to the filter drum or filter belt being clogged and/or due to the formation of sludge, the water is routed via the channel 12 onto the paddles 51 of the paddle wheel 50 and the same is placed into rotation. The overflowing unpurified water is collected in a catch basin 15 below the paddle wheel 50 and routed via a pipe to the outlet 13 that is disposed in one side of the housing 10, from where it is returned together with the purified water into the fish farming basin.

The rotation of the paddle wheel 50 is transferred via a gear mechanism 60 with a gear reduction ratio of approximately 1:100, which is formed of four gear wheels 61 ... 64, onto the first pulley 31; the first gear wheel 61 being supported on a driving feature 65 and rolling off during the rotation of the paddle wheel 50 on the stationary inner second gear wheel 62. Disposed coaxially to the first gear wheel 61 and rigidly connected to the same is the fourth gear wheel 64, with the number of teeth of the two gear wheels 61 and 64 in the present example being 100:101, thus resulting in the desired gear reduction of 1:100. The fourth gear wheel 64, in turn, interlinks in a comb-like fashion with the third gear wheel 63, which is disposed coaxial relative to the first gear wheel 61, so that in this manner a rotation of the paddle wheel 50 by one hundred rotations results in one full rotation of the third gear wheel 63, with a correspondingly geared-down torque on the first pulley 31, and via the belt 36 leading to the second pulley 43, onto the shaft of the receiving roller 41. A rotation of the paddle wheel 50 in the direction of the arrow accordingly results in a corresponding advancement of the filter belt 40 from the dispensing roller 42 to the receiving roller 41.

The function of this filtering device may be summarized as follows:

As long as the full amount per time unit of water to be purified that is routed to the filter chamber 20 can enter into the interior of the filter drum 30 while depositing dirt particles onto the filter belt 40, the water level remains at a constant value below the overflow opening 11A and only purified/filtered water flows from the outlet 13 back into the fish basin.

As the filter belt becomes increasingly dirty during the operation, the absorbing capacity of the filter drum decreases, the water level of the contaminated water outside the filter drum rises to the overflow opening 11A, the overflowing contaminated water places the paddle wheel 50 into rotation, as a result of which, as described above, the section of the filter belt 40 that is clogged by deposits is wound onto the receiving roller 41 and replaced by a new section from the dispensing roller 42. The overflowing contaminated water is also returned to the fish basin in the process.

As the permeability of the filter drum rises due to the supplied unused filter belt material, the percentage of purified water rises, the water level in the filter chamber 20 drops back below the overflow opening 11A, the paddle wheel 50 comes to a standstill.

This regulating cycle repeats itself.

The design of the drive means of the filter belt 40 with the paddle wheel 50 by means of a control loop is a mechanically simple, fully automatic solution with which the inventive filtering device is easy to operate under a definite function control of the rotating paddle wheel, and it additionally provides visual interest in that the technical design follows the style of a mill wheel.

| List of Reference Numerals | |
| --- | --- |
| 10 | Housing |
| 11 | Dividing wall |
| 11A | Opening |
| 12 | Channel |
| 12A | Discharge end |
| 13 | Outlet port |
| 14 | Second port |
| 15 | Catch basin |
| 16 | Pipe |
| 17 | Inlet port |
| 30 | Filter drum |
| 31 | First pulley |
| 35 | Filter material |
| 40 | Filter belt |
| 41 | Receiving roller |
| 41A, 42A | Deflecting rollers |
| 42 | Dispensing roller |
| 43 | Second pulley |
| 50 | Paddle wheel |
| 51 | Paddles |
| 60 | Gear mechanism |
| 61 | First gear wheel |
| 62 | Second gear wheel |
| 63 | Third gear wheel |
| 64 | Fourth gear wheel |
| 65 | Driving feature |

What is claimed is:

1. A filtering device, in particular for fish basins, comprising a housing (10) encompassing a filter chamber (20) and a filter drum (30), which is rotatably disposed in the filter chamber (20) and is loadable with water to be purified, about which a filter belt (40) is guided along part of its circumference from a dispensing roller (42) to a receiving roller (41) that is driven by a paddle wheel (50) disposed outside the filter chamber (20), whose paddles (51) are activated by unpurified water that flows over an overflow when an increasing degree of dirtying of the filter belt results in a rising water level in the filter chamber, in such a way that the filter belt (40) is wound from the dispensing roller (42) onto the receiving roller (41).

2. A filtering device according to claim 1, characterized in that a gear mechanism (60) is interposed between the paddle wheel (50) and receiving roller (41).

3. A filtering device according to claim 2, characterized in that the gear mechanism (60) has a gear reduction ratio of approximately 1:100.

4. A filtering device according to claim 1, characterized in that a biologically active filter material (35) is disposed in the filter drum (30).

5. A filtering device according to claim 1, characterized in that the supply of water to be purified takes place via an inlet port (17) of the housing (10) into the filter chamber (20) outside the filter drum (30).

6. A filtering device according to claim 1, characterized in that the dispensing roller (42) and receiving roller (41) are disposed above the filter drum (30) in the housing (10).

7. A filtering device according to claim 1, characterized in that the filter belt (40) is a fibrous web made of paper.

8. A filtering device according to claim 1, characterized in that the filter material (35) is a porous medium with bacteria (bio-reactor).

9. A filtering device comprising a housing (10) encompassing a filter chamber (20) and a filter drum (30), which is rotatably disposed in the filter chamber (20) and is loadable with water to be purified, about which a filter belt (40) is guided along part of its circumference from a dispensing roller (42) to a receiving roller (41) that is driven by a paddle wheel (5) disposed outside the filter chamber (20), whose paddles (51) are activated by unpurified water in such a way that the filter belt (40) is wound from the dispensing roller (42) onto the receiving roller (41) characterized in that a gear mechanism (60) is interposed between the paddle wheel (50) and receiving roller (41)and, for driving the receiving roller (41), a first pulley (31) that is disposed downstream of the gear mechanism (60) on the shaft of the paddle wheel (50) and a second pulley (43) that is disposed on the shaft of the receiving roller (41) are provided, which are connected to each other via a belt (36).

10. A filtering device comprising a housing (10) encompassing a filter chamber (20) and a filter drum (30), which is rotatably disposed in the filter chamber (20) and is loadable with water to be purfied, about which a filter belt (40) is guided along part of its circumference from a dispensing roller (42) to a receiving roller (41) that is driven by paddle wheel (5) disposed outside the filter chamber (20), whose paddles (51) are activated by unpurified rater in such a way that the filter belt (40) is wound from the dispensing roller (42) onto the receiving roller (41), characterized in that below the paddle wheel (50) and filter drum (30) a catch basin (15) is disposed, from which the unpurified water is discharged via a pipe (16) leading to an outlet port (13) of the housing (10) located opposite the paddle wheel (50) into a fish basin.

11. A filtering device according to claim 10, characterized in that the purified water is discharged from the interior of the filter drum (30) via a pipe through the outlet port (13) to the fish basin.

12. A filtering device comprising a housing (10) encompassing a filter chamber (20) and a filter drum (30), which is rotatably disposed in the filter chamber (20) and is loadable with water to be purified, about which a filter belt (40) is guided long part of its circumference from a dispensing roller (42) to a receiving roller (41) that is driven by a paddle wheel (5) disposed outside the filter chamber (20), whose paddles (51) are activated by unpurified water in such a way that the filter belt (40) is wound from the dispensing roller (42) onto the receiving roller (41), characterized in that an overflow opening (11A) is disposed in a dividing wall (11) of the housing (10) between the filter chamber (20) and paddle wheel (50) above a guide means (12), whose discharge end (12A) is located above the paddle wheel (50).

* * * * *